United States Patent [19]

Baisch et al.

[11] 3,961,344
[45] June 1, 1976

[54] DUAL FIELD VIEWFINDER

[75] Inventors: Theodor Baisch, Esslingen (Neckar); Kurt Deininger, Stuttgart; Joseph R. Strobel, Stuttgart-Wangen; Alfred Trumpp, Stuttgart-Uhlbech, all of Germany

[73] Assignee: Eastman Kodak Company, Rochester, N.Y.

[22] Filed: Nov. 29, 1974

[21] Appl. No.: 528,046

[52] U.S. Cl. .............................. 354/222; 354/197; 354/225
[51] Int. Cl.² ................. G03B 13/12; G03B 13/08
[58] Field of Search .......... 354/219, 221, 222, 223, 354/224, 225, 163–169, 199, 197

[56] References Cited
UNITED STATES PATENTS

| | | | |
|---|---|---|---|
| 3,589,236 | 6/1971 | Wareham | 354/222 |
| 3,619,202 | 11/1971 | Bellows | 354/222 X |
| 3,664,250 | 5/1972 | Land | 354/222 |
| 3,719,422 | 3/1973 | Land et al. | 354/166 X |
| 3,890,626 | 6/1975 | Ettischer | 354/197 |

FOREIGN PATENTS OR APPLICATIONS 488,071  1938  United Kingdom ............... 354/222

*Primary Examiner*—L. T. Hix
*Assistant Examiner*—E. M. O'Connor
*Attorney, Agent, or Firm*—A. B. Pagel

[57] ABSTRACT

A viewfinder of the inverted Galilean type, for use with a photographic camera having a pair of interchangeable objective lenses, comprising a viewfinder lens, an eyepiece having two reticles formed thereon, a fixed mirror frame and a movable mirror frame. The fixed mirror produces a projected virtual image of one reticle. Structure is provided for positioning the movable mirror to produce a projected virtual image of the second reticle in response to interchange of the objective lenses.

6 Claims, 4 Drawing Figures

DUAL FIELD VIEWFINDER

BACKGROUND OF THE INVENTION

1. Field of the Invention

This invention relates to a photographic camera with a plurality of interchangeable lenses of different focal lengths and to a viewfinder of the inverted Galilean type which has fields of view of different sizes adapted to the interchangeable lenses.

2. Description of the Prior Art

Photographic apparatus incorporating two or more interchangeable lenses of different focal lengths are well known. Viewfinders for use with such apparatus are also well known. One example of such a viewfinder may be found in German DT-PS 815,441, which discloses how lens members may be pivoted into or out of the optical axis of the viewfinder of a photographic or cinematographic camera, between the eyepiece and the front lens, in order to adapt the viewfinder's field of view to the different focal lengths of two interchangeable lenses. The lens members are arranged in spring-biased supports, the pivotal movement of which is effected by cables which are wound onto a drum via a number of guide rollers. The drum itself is in turn connected to the support of the interchangeable lenses by a cable via a further guide roller. This viewfinder is very complicated and expensive, and its design is not economical in respect of space.

SUMMARY OF THE INVENTION

Accordingly, it is an object of the invention to provide a photographic camera with an inexpensive viewfinder of simple construction which does not require much space and is therefore suitable for cameras with small dimensions.

This and other objects of the present invention are provided by a photographic camera having a viewfinder and a pair of objective lenses which are interchangeably positionable in the optical axis of the camera. The viewfinder is of the inverted Galilean type with a projected frame provided by a fixed reticle and mirror when the wide angle lens is in position. A second mirror is mounted for movement into the viewfinder to provide a second projected frame size in response to movement of the telephoto lens into the optical axis of the camera.

DESCRIPTION OF THE DRAWINGS

In the detailed description of the preferred embodiment presented below, reference is made to the accompanying drawing, in which.

DESCRIPTION OF THE PREFERRED EMBODIMENT

Because photographic apparatus is well known, the present description will be directed in particular to elements forming part of, or cooperating with, the present invention. Elements not specifically shown or described are understood to be selectable from those known in the art.

Figure 1:
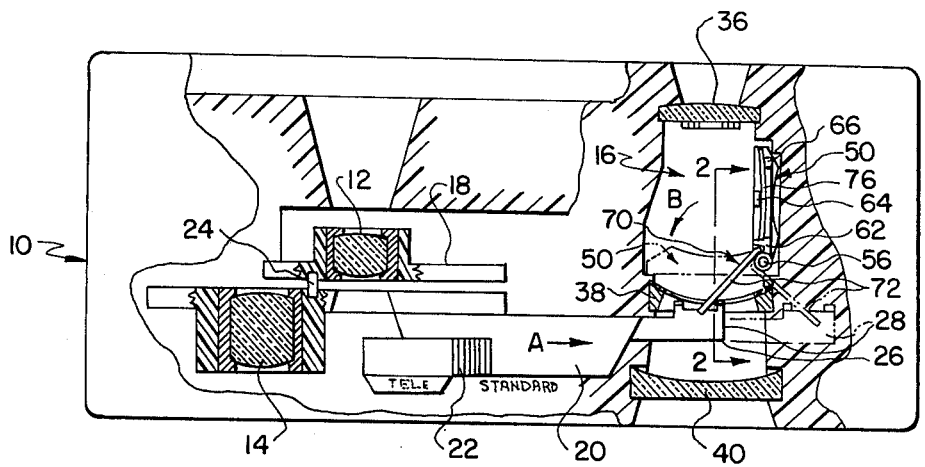
FIG. 1 shows a sectional plan view of the camera according to the present invention.

FIG. 1 illustrates a photographic camera 10 equipped with a standard lens 12 of normal focal length and a telephoto lens 14 of longer focal length. The camera also has a viewfinder 16 of the inverted Galilean type. Standard lens 12 is mounted in a lens carrier 18 and telephoto lens 14 is laterally displaced therefrom and mounted in a lens carrier 20, which is in front of lens carrier 18. Lens carrier 20 can be slid in the direction "A" by a serrated manipulating member 22, which projects above the surface of camera 10. An appropriate connection 24, between lens carriers 18 and 20, serves to cause lens carrier 18 to be moved along too, whereby standard lens 12 is moved out of the optical axis of the image field and telephoto lens 14 into it.

Lens carrier 20 has an arm 26, which includes a forklike end 28 that extends into the upper area of viewfinder 16 and includes a pair of lugs 30 and 31. Inner and outer reticles 32 and 34, which correspond with the focal lengths of the two lenses 12 and 14, are located on the planar, inner side of viewfinder eyepiece 36. A first mirror frame 38, preferably made of a non-transparent material, is fixedly arranged between viewfinder lens 40 and viewfinder eyepiece 36. Surface 42 of mirror frame 38, (FIG. 4), which faces viewfinder eyepiece 36, is mirror-coated and serves to make outer reticle 34, corresponding with standard lens 12, visible to the observer.

Figure 2:
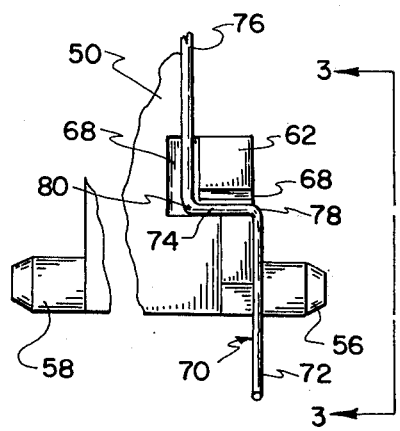
FIG. 2 shows an enlarged partial section view along the line 2—2 of FIG. 1.
Figure 3:
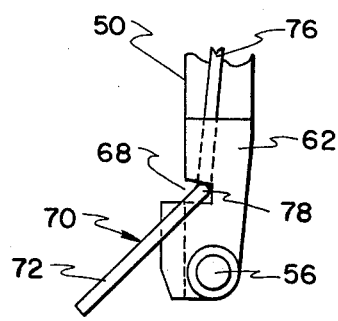
FIG. 3 shows a plan view along the line 3—3 of FIG. 2.

Behind mirror frame 38, there is a second mirror frame 50, which is mounted in a recess 52 on the right-hand side wall 54 of viewfinder 16 by means of two pivot pins 56 and 58 (FIG. 2). Mirror frame 50 can be pivoted in and out of the optical axis of viewfinder 16, behind the fixedly mounted mirror frame 38. Mirror frame 50 is also made of a non-transparent material, has a mirrorcoated surface 60 (FIG. 4) and serves to make inner reticle 32, corresponding with telephoto lens 14, visible to the observer. On one edge of mirror frame 50 there are three lugs 62, 64 and 66, which are out of line with one another, lug 62 being next to pivot pin 56 and having an angular recess 68 (FIGs. 2 and 3).

A wire spring 70 is provided having a driven end 72, a central portion 74 and a drive end 76. Driven end 72 extends between lugs 30 and 31 on fork-like end 28 of telephoto lens carrier 20. Wire spring 70 is generally Z-shaped with driven end 72 and central portion 74 intersecting at a bend 78, which is substantially 90° and with central portion 74 and drive end 76 intersecting at a bend 80 which is also substantially 90°. During assembly, central portion 74 of wire spring 70 is laid in recess 68. Drive end 76 is held fast between lugs 62, 64 and 66 while driven end 72 is in operational connection with lugs 30 and 31 on fork-like end 28 of telephoto lens carrier 20.

In FIG. 1, standard lens 12 is in the image field raypath. Only fixed mirror frame 38 is needed in viewfinder 16, outer reticle 34 on eyepiece 36 being reflected via mirror-coated surface 42 on mirror frame 38 to form a projected vertical image. Fork-like end 28 holds, with lug 30, driven end 72 of wire spring 70 in the opposite direction to the arrow "A", which causes pivotable mirror frame 50 to rest against a stop 53 in viewfinder recess 52.

Figure 4:
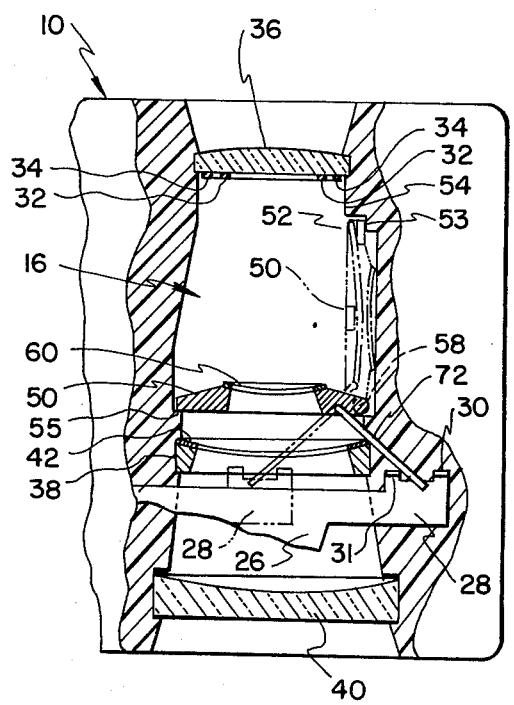
FIG. 4 shows a sectional, plan view of the viewfinder according to FIG. 1, on a larger scale.

If an engagement (not illustrated) is overcome, lens carriers 18 and 20 may be slid in the direction "A" in order to bring telephoto lens 14 into the operative position. Simultaneously, lug 31 on fork-like end 28 causes driven end 72 of wire spring 70 to also be moved in the direction "A", mirror frame 50 being pivoted behind fixed mirror frame 38, in the direction "B", into the viewfinder raypath. By a second engagement, lens carriers 18 and 20 are fixed in their new position. As can be seen in FIG. 4, fork-like end 28 now holds driven end 72 in the direction of the arrow "A" with lug 31, mirror frame 50 resting against a stop 55. The wider form of pivotable mirror frame 50 then covers the narrower form of fixed mirror frame 38. Only the smaller inner reticle 32, which corresponds with the picture area of telephoto lens 14 and is located on the planar side of eyepiece 36, is reflected by way of mirror surface 60 to form a projected virtual image.

Needless to say, the invention is not restricted solely to the example featured here. It is also perfectly possible to use a zero power lens with a mirror surface coated to be semi-transparent or a zero power lens whose edge is completely mirror-coated, instead of a pivotable frame 50 which is non-transparent and provided with a mirror-coated surface 60.

The invention has been described in detail with particular reference to a preferred embodiment thereof, but it will be understood that variations and modifications can be effected within the spirit and scope of the invention.

We claim:

1. Photographic apparatus comprising a plurality of lenses that can be selectively moved to a first operative position and a viewfinder, said viewfinder comprising:
   a pair of reticles of different size;
   first reflective means for projecting a virtual image of one of said reticles; and
   second reflective means, mounted within said photographic apparatus for movement to a second operative position, for projecting a virtual image of the other of said reticles after movement to said second operative position in response to selective movement of one of said plurality of lenses in such photographic apparatus to said first operative position.

2. Photographic apparatus as in claim 1, wherein said second reflective means includes spring means movable, in response to selective movement of one of said plurality of lenses in such photographic apparatus, for moving at least a portion of said second reflective means to said second operative position.

3. Photographic apparatus comprising a plurality of lenses that can be selectively moved to a first operative position and a viewfinder, said viewfinder comprising:
   a pair of reticles of different sizes;
   a first mirror positioned to project a virtual image of one of said reticles;
   a second mirror mounted for movement to a second operative position wherein said second mirror projects a virtual image of the other of said reticles; and
   means, including a spring operatively coupled to said second mirror, for moving said second mirror to said second operative position in response to selective movement of one of said plurality of lenses of such photographic apparatus to said first operative position.

4. Photographic apparatus comprising two interchangeable lenses that can be selectively moved to a first operative position and a viewfinder, said viewfinder comprising:
   a pair of reticles of different sizes;
   a fixed mirror positioned to project a virtual image of one of said reticles;
   a movable mirror mounted for movement to a second operative position wherein said movable mirror obscures said fixed mirror and projects a virtual image of said second reticle; and
   means, including a spring operatively coupled to said movable mirror, for moving said movable mirror to said second operative position in response to movement of one of said interchangeable lenses of said photographic apparatus to said first operative position.

5. Photographic apparatus comprising:
   a pair of objective lenses;
   means for interchangeably moving each of said objective lenses to an operative position within said photographic apparatus;
   a viewfinder comprising:
   an eyepiece having a first and a second reticle of different sizes formed thereon and defining an optical path for said viewfinder;
   a first mirror positioned along said optical path to project a virtual image of said first reticle; and
   a second mirror movable between a first and a second position, said first position being out of the optical path of said viewfinder and said second position being along said optical path so that said second mirror projects a virtual image of said second reticle, and said second mirror being of a dimension and shape to prevent said first mirror from projecting a virtual image of said first reticle when said second mirror is in said second position; and
   means, including a spring operatively coupled to said second mirror and to said interchangeable moving means, for moving said second mirror to said second position in response to movement of one of said objective lenses to said operative position.

6. Photographic apparatus having an optical path and comprising:
   a first objective lens having a predetermined focal length;
   a second objective lens having a predetermined focal length that is longer than said first objective lens;
   means for selectively positioning either said first objective lens or said second objective lens within the optical path of said photographic apparatus;
   a viewfinder comprising:
   an eyepiece having a first and a second reticle corresponding, respectively, to said first and second objective lenses;
   a first mirror positioned to project a virtual image of said first reticle; and
   a second mirror movable from a storage position to an operative position to project a virtual image of said second reticle and to prevent projection of a virtual image of said first reticle; and
   a spring engaged with said second mirror and movable by said selective positioning means to selectively move said second mirror to said operative position when said second objective lens is positioned with said optical path.

* * * * *

PO-1050
(5/69)

UNITED STATES PATENT OFFICE
CERTIFICATE OF CORRECTION

Patent No. 3,961,344    Dated June 1, 1976

Inventor(s) Theodor Baisch, Kurt Deininger, Joseph R. Strobel

It is certified that error appears in the above-identified patent and that said Letters Patent are hereby corrected as shown below:

On the title page, between items [21] and [52] insert:

-- [30] Foreign Application Priority Data January 8, 1974
    Germany --    7400448 --.

Signed and Sealed this

Ninth Day of November 1976

[SEAL]

*Attest:*

RUTH C. MASON
*Attesting Officer*

C. MARSHALL DANN
*Commissioner of Patents and Trademarks*